(No Model.)
F. GUNTHER.
CHECK ROW CORN PLANTER.
No. 570,474. Patented Nov. 3, 1896.
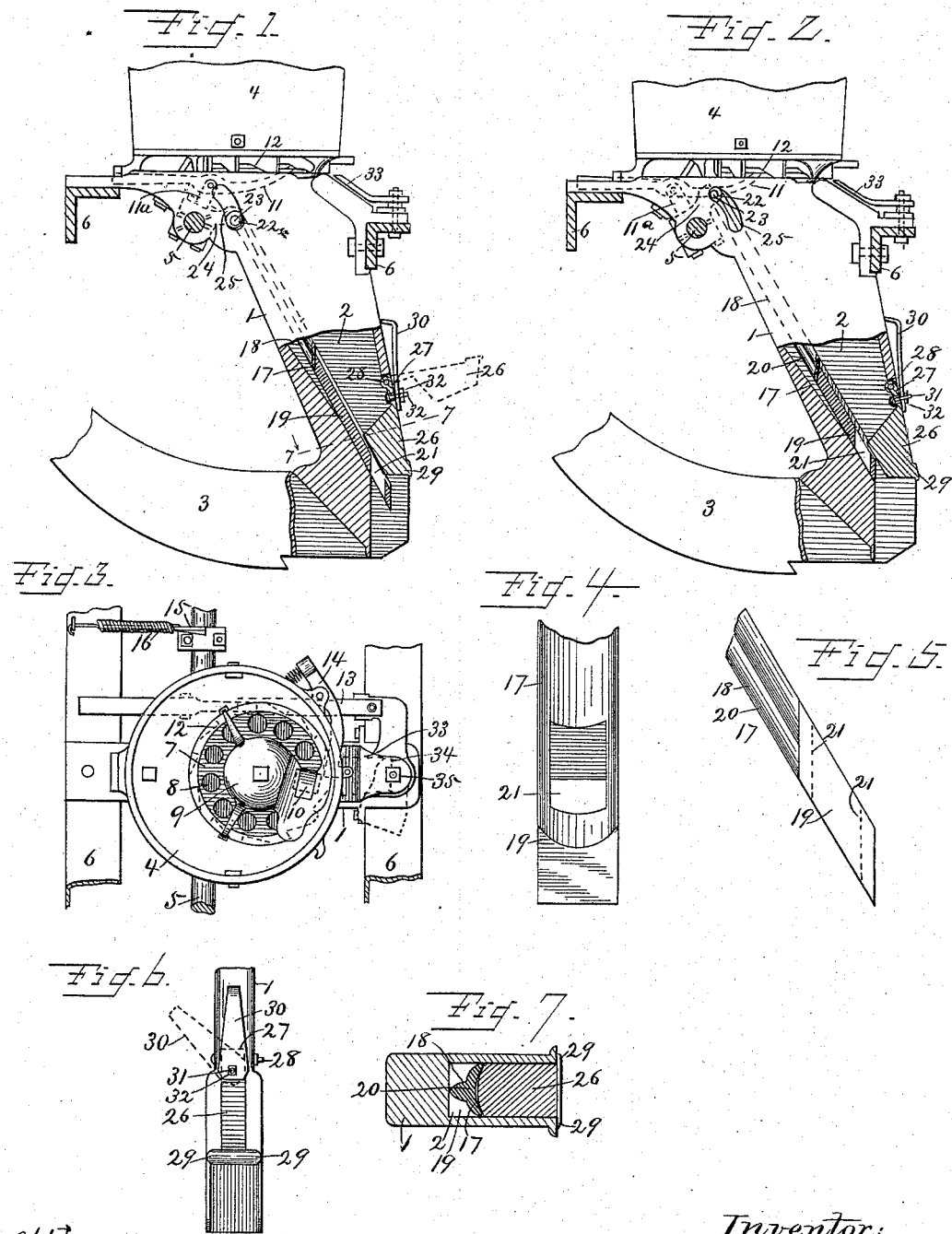
Witnesses:
J. R. Richards.
H. M. Richards.
Inventor:
Fredrick Gunther;
By W. B. Richards,
his Atty.

UNITED STATES PATENT OFFICE.

FREDRICK GUNTHER, OF KEWANEE, ILLINOIS.

CHECK-ROW CORN-PLANTER.

SPECIFICATION forming part of Letters Patent No. 570,474, dated November 3, 1896.

Application filed July 25, 1896. Serial No. 600,569. (No model.)

*To all whom it may concern:*

Be it known that I, FREDRICK GUNTHER, a citizen of the United States, residing at Kewanee, in the county of Henry and State of Illinois, have invented certain new and useful Improvements in Check-Row Corn-Planters, of which the following is a specification.

My invention relates to improvements in the lower valves or seed-discharging valves in the seed-tubes of corn-planters of that type of planters in which seed-measuring mechanism or valves are used in the seedbox to measure and deliver charges of seed to the seed-tube, near the lower end of which tube the charges are received and detained by another valve from which they are discharged to the place of deposit in the soil.

In the type of seed measuring and dropping mechanisms above referred to the lower valve or seed-discharging valve at the lower end of the seed-tube is, in so far as known to me, opened to discharge seed simultaneously with the opening of the seed-measuring valves in the seedbox, and hence a portion of the charges of seed delivered by the seedbox valves will frequently reach the lower valve before said valve is closed, and, escaping past or through the same, will be dribbled and deposited between the check-rows. To prevent the seed escaping as last described, intermediate valves of different kinds have been devised, which are adapted to receive each charge of seed delivered by the seedbox-valves and detain it until the lower or discharging valve is making or has about completed its return or closing stroke, when the intermediate valve delivers the charge of seed to the discharging-valve after said discharging-valve is closed, and thus prevents all dribbling of seed between the regular deposits thereof.

The main object of my invention is to provide an improved lower valve or discharging-valve; and a further object is to provide an intermediate valve which, acting in combination with said discharging-valve and its stem, will detain the charges of seed effectually at the proper time, and also deliver them at the proper time to the lower or discharging valve, and which intermediate valve is adjustable and removable, and is held to its seat by a spring.

To the end of carrying out these main objects, my invention consists in constructions and combinations hereinafter described, and made the subject-matter of claims hereto appended.

Mechanism embodying the preferred construction, arrangement, disposition, and combination of the different parts of my improvement and adjacent parts of an ordinary corn-planter with which my improvements are incorporated are illustrated in the accompanying drawings, in which—

Figure 1 is a side elevation of parts of a two-row corn-planter, consisting of a seed-tube, runner, and the intermediate and lower valves partly in section, side elevation of part of the seedbox and adjacent parts, and sectional elevation of parts of the planter-frame and the rock-shaft and other parts shown by dotted lines. Fig. 2 shows the same parts as Fig. 1, but in different relative positions from that shown at Fig. 1; Fig. 3, a top plan of the parts shown at Figs. 1 and 2, the parts in same relative positions as at Fig. 1; Fig. 4, a rear elevation of the lower part of the lower or seed-discharging valve; Fig. 5, a side elevation of the part of the lower or seed-discharging valve shown at Fig. 4; Fig. 6, a rear elevation of the lower end of the seed-tube, the intermediate valve, and spring; Fig. 7, a sectional plan in the line 7 7 in Fig. 1.

I have preferred in the drawings to show my improvements as incorporated with parts of a two-row planter. It will be evident, however, that they may be used in single-row planters or multirow planters of any kind. The standard 1, with its seed duct or tube 2, runner 3, seedbox 4, rock-shaft 5, frame-bars 6, rotary seed-cup disk 7, with circular series of seed-cups 8, cap-plate 9, cut-off 10, pawl 11, teeth 12, on the disk 7, with which teeth the pawl 11 is held in contact in its forward movement either by its weighted outer end or by a spring 13, spring-actuated detent 14, arm 15, projecting from the rock-shaft 5, and spring 16, connecting said arm with a frame-bar, are parts of an ordinary well-known type of check-row corn-planter, and need not be any further herein described.

The rock-shaft 5 is in most cases operated or swung in one direction by an ordinary check-row line with buttons or tappets, with which forked levers on the planter come in contact as the planter is moved across the field adjacent to the check-row line, and thus actuate the seed-cup disk 7 and deliver a charge of seed to the seed-tube, and is swung in an opposite direction by the spring 16 acting on the arm 15. The forked levers and buttons referred to are not shown. In other cases the rock-shaft 5 is actuated by gear-connection with the planter wheel and axle, and in still other cases is actuated by hand. The outer end of an arm 11ª, which projects from the rock-shaft, is pivotally connected with the pawl 11. (See dotted lines at Figs. 1 and 2.)

The lower valve or discharging-valve 17 comprises a stem part 18 and an enlarged lower-end part 19, the lateral and front sides of which fit closely to the lateral and front sides of the seed-duct 2, as shown at Figs. 1, 2, and 7. The rear side of the part 19 is preferably slightly concave in its cross-section, Fig. 7, and a rib 20 extends from the upper end thereof upwardly along the front side of the stem 18, which fits and slides against the front side of the seed-duct. The part 19 with the vertical opening 21 therethrough constitutes the main part of the lower valve 17, and the opening 21 serves as a chamber to retain or hold a charge of seed when the valve 17 is in its retracted or highest position and resting against the inclined forward side of the seed-duct, as shown at Fig. 2. The upper end of the stem 18 has a lateral hole or perforation 22, which receives a pin 23, that projects laterally from an arm 24, which projects from the rock-shaft 5. (See dotted lines at Figs. 1 and 2.) The pin 23 projects through curved slots 25 in the sides of the standard 1, whereby it is permitted to move in the arc of a circle with the oscillations of the rock-shaft and for the purpose of raising and lowering the lower or seed-discharging valve 17.

The intermediate valve 26 is seated in the open rear side of the seed-duct 2 at the lower end thereof, and its upper end 27 is extended and perforated for the reception of a bolt 28, by which the valve is pivoted to swing outwardly and inwardly at its lower end. Ledges 29 project laterally from the lower end of the valve 26 outwardly over the side walls of the seed-duct 2 and limit the inward movement of said valve. A spring-plate 30 is held at its upper end against the rear side of the standard 1, and at its lower end against the valve 26 by a bolt 31 and nut 32. By adjustments of the nut 32 the pressure of the spring on the intermediate valve 26 may be regulated as desired to hold said valve with a greater or lesser yielding spring force against the part 19 of the valve 17, so that the valve 26 may yield and not break grains of seed projecting out of the seed-chamber 21. By turning the upper end of the spring-plate 30 to one side (see Fig. 6) the lower end of the valve 26 may be turned outwardly, as shown by dotted lines at Fig. 1, for the purpose of removing soil or matter of any kind that may have accumulated at or below said valve by backward movements of the planter.

The cap 33 covers an opening 34 in the upper inclined rear part of the standard 1, through which opening the interior of the seed-duct 2 and the lower valves may be seen by first swinging the cap 33 on its pivot-bolt 35 around to the position shown by dotted lines at Fig. 3. The opening 34 is shown by dotted lines at same figure.

Assuming the parts to be in the relative positions shown at Fig. 1, any seed contained in the chamber 21 will escape, as said chamber is beyond the lower part of the front side of the seed-duct. The rock-shaft being then turned forwardly will not act on the seed-cup disk or valve in the seedbox, but will by raising the arm 24 raise or retract the valve 17 to the position shown at Fig. 2. When the rock-shaft and arm 24 are now turned to the position shown at Fig. 1, the valve 17 will thereby be thrust downwardly to the position shown at same figure, and the chamber 21 will discharge the charge of seed it contains into the furrow made by the runner or furrow-opener 3. The movement of the rock-shaft last described will, by means of the arm 11ª and pawl 11, give a partial rotation to the seed-cup disk and thereby deliver a charge of seed to the seed-tube, which, falling, will be received on the upper inclined side of the intermediate valve 26 and be detained between the same and the confronting side of the valve 17 until the rock-shaft is again moved in the opposite direction to retract the valve 17 and bring the seed-chamber 21 into the position shown at Fig. 2, when the said charge of seed will pass into the chamber 21 and be held there until the rock-shaft is again turned to force the valve 17 down to its Fig. 1 position, as before described, where it will again discharge its contained charge of seed.

It will be seen from the foregoing description that none of the seed in the charge dropped from the valve in the seedbox can reach the chamber 21, while it is free to discharge them, and that the chamber 21 receives the charge of seed from the intermediate valve on the upward movement of the valve 17, given it by the spring 16. It will further be seen that the valve 17 simply has an end-long reciprocating movement, and has not in any way an oscillatory movement or swinging movement at its lower end on any pivotal point above said lower end.

It will be evident that other types of valves in the seedbox than that which I have shown in the drawings may be used with my improvements, and hence I do not limit my claims in which the particular valves in the seed-box are not included to any particular kind or type of such valves. I also wish it distinctly understood that I do not limit myself to the details of construction shown, but regard myself as entitled to such variations therefrom as fall within the scope of my invention.

Having thus described my invention, what I claim as new, and desire to secure by Letters Patent, is—

1. In a corn-planter, and in combination, a standard having a seed-duct, a seed measuring and delivering valve in the seedbox, an endwise-reciprocating valve in the seed-duct having a seed-chamber near its lower end, and an inclined forward side of the seed-duct which serves to close said seed-chamber when in its highest position, substantially as described.

2. In a corn-planter, and in combination, a standard having a seed-duct, a seed measuring and delivering valve in the seedbox, an endwise-reciprocating valve in the seed-duct having a through seed-chamber in its lower end, an inclined forward side of the seed-duct which serves to close said seed-chamber when in its highest position, and an intermediate valve located in rear of the seed-chamber of the reciprocating valve, substantially as described.

3. In a corn-planter, and in combination, a standard having a seed-duct, a seed measuring and delivering valve in the seedbox, an endwise-reciprocating valve in the seed-duct having a through seed-chamber in its lower end, an inclined forward side of the seed-duct which serves to close said seed-chamber when in its highest position, and an intermediate valve located in rear of the seed-chamber of the reciprocating valve, and pivoted or hinged to the standard to permit of swinging it outwardly at its lower end, substantially as described.

4. In a corn-planter, and in combination, a standard having a seed-duct, a seed measuring and delivering valve in the seedbox, an endwise-reciprocating valve in the seed-duct having a through seed-chamber in its lower end, an inclined forward side of the seed-duct, an intermediate valve located in rear of the seed-chamber of the reciprocating valve and pivoted or hinged to the standard, and a spring for pressing the intermediate valve with a yielding spring-pressure toward the reciprocating valve, substantially as described.

5. In a corn-planter, and in combination, a standard having a seed-duct, a seed measuring and delivering valve in the seedbox, an endwise-reciprocating valve in the seed-duct having a substantially vertical seed-chamber in its lower end, means for simultaneously opening and closing both of said valves, and an inclined forward side of the seed-duct adapted to close the discharge side of the seed-chamber in the reciprocating valve when said valve is moved to its higher position, and to permit the seed to discharge therefrom when the valve is moved to its lower position, substantially as described.

In testimony whereof I affix my signature in presence of two witnesses.

FREDRICK GUNTHER.

Witnesses:
A. P. GUNTHER,
H. M. RICHARDS.